United States Patent
Dinter (10) Patent No.: US 12,092,078 B2
(45) Date of Patent: Sep. 17, 2024

(54) ADJUSTABLE ROTOR SHAFT ASSEMBLY, DATA AGGLOMERATION, GENERATOR GEARBOX AND WIND TURBINE

(71) Applicant: Flender GmbH, Bocholt (DE)

(72) Inventor: Ralf Martin Dinter, Gelsenkirchen (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/016,228

(22) PCT Filed: Jul. 13, 2021

(86) PCT No.: PCT/EP2021/069460
§ 371 (c)(1),
(2) Date: Jan. 13, 2023

(87) PCT Pub. No.: WO2022/013219
PCT Pub. Date: Jan. 20, 2022

(65) Prior Publication Data
US 2023/0340943 A1 Oct. 26, 2023

(30) Foreign Application Priority Data
Jul. 17, 2020 (EP) .................................. 20186499

(51) Int. Cl.
*F03D 15/00* (2016.01)
*F16D 3/18* (2006.01)
(Continued)

(52) U.S. Cl.
CPC .............. *F03D 15/00* (2016.05); *F16D 3/185* (2013.01); *B33Y 50/00* (2014.12);
(Continued)

(58) Field of Classification Search
CPC ......... F03D 15/00; F16D 3/185; B33Y 50/00; F05B 2260/40311; F16H 2057/02078
See application file for complete search history.

(56) References Cited

U.S. PATENT DOCUMENTS 3,142,972 A   8/1964  Spaulding, Jr.
4,909,773 A * 3/1990  Schlecher ............... F16D 3/185
                                               464/159
(Continued)

FOREIGN PATENT DOCUMENTS

DE      1 142 473 B       1/1963
DE   10 2009 048 735 A1    4/2011
WO      WO 02/081280      10/2002

OTHER PUBLICATIONS

International Search Report issued on Sep. 20, 2021 by the European Patent Office in International Application PCT/EP2021/069460.

*Primary Examiner* — Edwin A Young
(74) *Attorney, Agent, or Firm* — Henry M. Feiereisen LLC (57) ABSTRACT

A rotor shaft assembly for a torque-transmitting connection of a gearbox unit to a generator unit includes an output shaft for the gearbox unit, a rotor shaft for the generator unit, and a curved tooth coupling designed to connect the output shaft and the rotor shaft to one another The curved tooth coupling includes a releasably fastened supporting element designed to axially position the curved tooth coupling and including a mating face to support an axial force of the curved tooth coupling, with the mating face being designed to slide on a corresponding support face of the output shaft or of the rotor shaft when the output shaft is tilted relative to the rotor shaft.

13 Claims, 3 Drawing Sheets

(51) Int. Cl.
*B33Y 50/00* (2015.01)
*F16H 57/02* (2012.01)

(52) U.S. Cl.
CPC ............... *F05B 2250/241* (2013.01); *F05B 2260/40311* (2013.01); *F16H 2057/02078* (2013.01)

(56) References Cited

U.S. PATENT DOCUMENTS

| | | | |
|---|---|---|---|
| 10,363,705 B1* | 7/2019 | Marsch | ............ B22F 10/31 |
| 2004/0107865 A1 | 6/2004 | Hohl | |
| 2011/0018283 A1* | 1/2011 | Haughom | ............ F03D 15/00 |
| | | | 290/55 |
| 2011/0272214 A1 | 11/2011 | Vuolle-Apiala et al. | |
| 2012/0274074 A1* | 11/2012 | Tenberge | ............ F03D 13/20 |
| | | | 290/54 |
| 2020/0353671 A1* | 11/2020 | Wang | ............ B22F 10/18 |

\* cited by examiner

FIG 2

ADJUSTABLE ROTOR SHAFT ASSEMBLY, DATA AGGLOMERATION, GENERATOR GEARBOX AND WIND TURBINE

CROSS-REFERENCES TO RELATED APPLICATIONS

This application is the U.S. National Stage of International Application No. PCT/EP2021/069460, filed Jul. 13, 2021, which designated the United States and has been published as International Publication No. WO 2022/013219 A1 and which claims the priority of European Patent Application, Serial No. 20186499.8, filed Jul. 17, 2020, pursuant to 35 U.S.C. 119(a)-(d).

BACKGROUND OF THE INVENTION

The invention relates to a rotor shaft assembly having an output shaft and a rotor shaft as well as to a data agglomerate, with the aid of which the rotor shaft assembly can be produced and/or simulated by additive manufacturing. The invention likewise relates to a generator gearbox that has such a rotor shaft assembly. Furthermore, the invention relates to a wind turbine that is equipped with such a generator gearbox.

Publication US 2011/272214 A1 discloses a generator gearbox that comprises a gearbox unit and a generator unit. A sun shaft of a planetary stage is provided at a generator-proximal end with a toothing which belongs to a coupling which establishes a connection to a rotor shaft. The coupling is curved to compensate for an offset between the sun shaft and the rotor shaft. Spaced radially from the toothing, the rotor shaft is mounted via bearings which can support axial forces that occur.

International patent application WO 02/081280 A1 shows a vehicle drive in which a rotor shaft of a drive motor is connected to a gearbox via a curved tooth coupling. The rotor shaft is received in the curved tooth coupling in an internally toothed component which is connected to a gear pinion.

Curved tooth couplings are known in which covers are disposed next to the curved toothings at axial ends of a coupling spacer. The covers ensure that the curved tooth coupling is sealed against a leakage of lubricant.

Shaft couplings with a curved tooth coupling are known from DE 10 2009 048735 A1, DE 11 42 473 B and U.S. Pat. No. 3,142,972 A.

In different applications there is a need for connections between shafts that are suitable for transmitting high drive powers and for compensating for an angular misalignment. At the same time, there is the objective of configuring such connections so as to be compact. This applies particularly to wind turbines in which a gearbox is to be connected to a generator, for example in an integrated generator gearbox. Likewise, a simple and economical production of such solutions is sought. The object of the invention is to provide a rotor shaft assembly which offers an improvement in at least one of the points outlined.

SUMMARY OF THE INVENTION

The object is achieved by a rotor shaft assembly as set forth hereinafter, and by a data agglomerate as set forth hereinafter. Preferred design embodiments of the invention are set forth in the dependent claims and the following description, which may individually or in combination represent an aspect of the invention. A description of a feature conjointly with another feature is only provided for reasons of simplified representation and is not intended to rule out that the respective feature can also represent a refinement of the invention in the absence of the other feature.

The object is achieved by a rotor shaft assembly according to the invention for the torque-transmitting connection of a gearbox unit to a generator unit. The rotor shaft assembly comprises an output shaft for the gearbox unit and a rotor shaft for the generator unit. In the assembled state, the gearbox unit and the generator unit are connected to one another in a torque-transmitting manner by a curved tooth coupling. For this purpose, the curved tooth coupling is connected to the output shaft and the rotor shaft. The output shaft can be partially received in the rotor shaft by means of the curved tooth coupling, or the rotor shaft can be partially received in the output shaft by means of the curved tooth coupling. The curved tooth coupling also comprises at least one supporting element. The at least one supporting element is configured for axially positioning the curved tooth coupling and is releasably fastened. The at least one supporting element is configured to limit a relative axial mobility of the curved tooth coupling, and thus of the rotor shaft in relation to the output shaft. The at least one supporting element has a mating face that supports axial forces of the curved tooth coupling, the mating face being designed such that it can slide on a corresponding support face of the output shaft or of the rotor shaft when the output shaft is tilted relative to the rotor shaft. This allows the output shaft to tilt relative to the rotor shaft in order to compensate for an angular offset, while at the same time a discharge of axial forces is provided via the at least one supporting element in order to limit an axial relative movement of the output shaft with respect to the rotor shaft and to prevent in particular an axial migration of the output shaft away from a torque-transmitting coupling to the rotor shaft. Accordingly, an axial migration of the rotor shaft on the output shaft can be avoided during operation. Accordingly, the curved tooth coupling can be of compact configuration along an axial direction, that is to say substantially along a main rotation axis of the gearbox unit and/or generator unit. The rotor shaft can therefore also be received in a cantilever bearing. The axial positioning of the curved tooth coupling guarantees smooth mobility and enables an adjustable, in particular angle-adjustable, behavior between the output shaft and the rotor shaft. The at least one supporting element can be produced separately in a simple manner and allows rapid assembly and disassembly of a generator gearbox with a gearbox unit and generator unit.

The at least one supporting element can comprise a first supporting element and/or a second supporting element. This means that the set of the at least one supporting element can include exactly one first supporting element, exactly one second supporting element and both the first supporting element and the second supporting element. Preferably, only the first supporting element and the second supporting element are provided at the same time, so that a third supporting element and further supporting elements are avoided. In particular, the first supporting element and the second supporting element are provided at different axial ends of the curved tooth coupling, in particular the first supporting element and the second supporting element being movable toward one another during assembly with a movement component in the axial direction in order to eliminate an axial clearance of the rotor shaft in relation to the output shaft, in particular in the region of the curved tooth coupling, or to limit it to a predefined axial clearance, for example in order to provide an axial clearance fit and/or to be able to compensate for an axial thermal expansion of the rotor shaft and/or output shaft that is to be anticipated during the ongoing operation.

The first supporting element and the second supporting element can be provided at a predefined axial spacing from one another. In principle, it is possible that the axial relative position of the supporting elements relative to the rotor shaft and to the output shaft is not predefined, but instead depends on an angular offset to be compensated for by the curved tooth coupling. For this purpose, a support location of the respective supporting element pointing away from the curved tooth coupling can be designed to be axially displaceable, for example with the aid of a screw device engaging on the rotor shaft or on the output shaft.

The at least one supporting element, in particular the first supporting element and/or the second supporting element, has the mating face that, with the aid of the curved tooth coupling, can slide on the curved tooth coupling when the output shaft is tilted relative to the rotor shaft in order to compensate for an angular misalignment, said mating face being able to slide on the corresponding support face of the output shaft or of the rotor shaft in the region of the curved tooth coupling. The curved tooth coupling can have a curved region which is provided with a toothing in an inner partial region and, on an outer partial region that adjoins the inner partial region, by way of the output shaft or the rotor shaft configures the support face which interacts with the at least one supporting element. Preferably, the support face is formed by a non-toothed curved region of the coupling partner of the curved tooth coupling formed by the output shaft or by the rotor shaft. For example, the support face and the mating face are configured as, in particular annular, spherical caps that can slide on one another. The support face and the curved tooth coupling can slide on one another in the manner of a ball socket bearing. This allows the output shaft to tilt relative to the rotor shaft in order to compensate for an angular offset, while at the same time the discharge of axial forces via the at least one supporting element is provided in order to limit an axial relative movement of the output shaft in relation to the rotor shaft and to prevent in particular an axial migration of the output shaft away from a torque-transmitting coupling to the rotor shaft. The output shaft is preferably coupled to the rotor shaft in an axially captive manner by the at least one supporting element.

Particularly preferably, it is provided that the first supporting element and the second supporting element, conjointly with the assigned support faces, form a ball joint bearing for the curved tooth coupling. An axial clearance can be minimized as a result, while at the same time a tilting of the output shaft relative to the rotor shaft to compensate for an angular offset is permitted, but occurring axial forces can already be supported in the region of the curved tooth coupling on the ball socket bearing which is formed.

In particular, the at least one supporting element develops a compensating axial clearance of the output shaft relative to the rotor shaft for compensating for axial thermal expansions to be anticipated during the ongoing operation. Provided in particular between the respective support faces and the mating face of the respective supporting element that interacts with the respective support face is an axial clearance, in particular in the order of a clearance fit, so that the curved tooth coupling cannot jam between the first supporting element and the second supporting element in the case of thermal expansion effects to be anticipated.

In a further embodiment of the claimed rotor shaft assembly, a first supporting element is disposed on a side of the curved tooth coupling that faces the gearbox unit. Accordingly, the mobility between the rotor shaft and the output shaft can be restricted in a simple manner on one side and the curved tooth coupling can be centered in an intended position. Alternatively or additionally, a second supporting element can be disposed on a side of the curved tooth coupling that faces the generator unit. As a result, the mobility between the rotor shaft and the output shaft can be restricted in a simple manner on one side. This also means that the curved tooth coupling is in an intended position, which ensures that the angle between the rotor shaft and the output shaft can be set smoothly. A combination of the first and second supporting element offers particularly precise axial positioning of the curved tooth coupling. The angular offset between the rotor shaft and the output shaft is in each case also determined by the supporting elements. Correspondingly precise axial positioning of the curved tooth coupling makes it possible to keep the toothings of the latter in an optimum engagement, as a result of which an increased transmission of torque is made possible and at the same time the angular adjustability is guaranteed. Furthermore, the first and the second supporting elements, respectively, support an axial load acting on the output shaft. The axial load acting on the output shaft depends on the pitch of a helical gear that introduces a torque into the output shaft.

Furthermore, in the rotor shaft assembly claimed, at least one support face can be configured on the output shaft or the rotor shaft. The support face is configured to support the at least one supporting element. The support face is a region of the output shaft or of the rotor shaft which in terms of shape and hardness is designed to be suitable for contact with the at least one supporting element. The support face may be formed integrally with the output shaft or the rotor shaft, respectively, or as a region of a separate, releasably assembled component. A support face configured integrally with the rotor shaft or output shaft can be produced with increased accuracy, which guarantees precise axial positioning of the curved tooth coupling. A support face configured on a separate component allows for cost-effective separate manufacturing and easy interchangeability. Furthermore, a particularly high-performance and cost-intensive material can also be used in accordance with the requirements and accordingly in an economical manner.

In a further refinement of the claimed rotor shaft assembly, the at least one support face is configured as a shoulder in the region of a curved toothing that is part of the curved tooth coupling. In particular, the shoulder can be connected directly to the curved toothing and/or can be disposed directly adjacent to it. Curved toothings can be configured integrally with the rotor shaft and/or the output shaft, which guarantees that the curved toothing is particularly load-resistant. When producing the curved toothing, a shoulder that is suitable as support face can be integrated into an existing production process in a simple manner. Furthermore, the shoulder is suitable for guaranteeing that a load is introduced into the rotor shaft or output shaft in a manner matching the load. Moreover, shoulders on the rotor shaft or output shaft can be adjusted in terms of curvature. The claimed rotor shaft assembly can be adapted to different mechanical stresses and different space requirements by suitable shaping of the shoulder. The longer the shoulder is configured in the axial direction, the less clearance there is for the angular adjustability of the curved tooth coupling. The claimed rotor shaft assembly is accordingly scalable and has a wide range of applications.

Furthermore, in the claimed rotor shaft assembly, the at least one releasably fastened supporting element can have an at least partially encircling concave portion of the mating face for axial positioning of the curved tooth coupling. The concavely formed section serves as a counterpart to the support face, which is disposed opposite the former. The at least partially encircling concave portion of the supporting element can be configured to correspond to a spherical portion, that is to say can be of a spherical configuration. Such a shape of the supporting element allows a smooth angular adjustability between the rotor shaft and the output shaft and at the same time an advantageously precise axial positioning effect. Alternatively or additionally, the support face can be configured to be convex in at least partially encircling manner. In particular, the support face can be configured to be convex so as to correspond to the supporting element, so that precise guiding is guaranteed when an angular offset occurs between the rotor shaft and the output shaft. In particular, the support face can be configured to correspond to a spherical portion, that is to say can have a spherical shape. Such shapes can be produced precisely and cost-effectively and offer a high mechanical load capability. The at least partially encircling convex support face and/or the at least partially encircling concave portion of the supporting element can have a common center which corresponds to a tilting axis of the curved tooth coupling. This guarantees, in particular, a continuously smooth angular adjustability between the rotor shaft and the output shaft.

Furthermore, in the claimed rotor shaft assembly, the output shaft and/or the rotor shaft can be configured as a hollow shaft. An output shaft and/or rotor shaft configured as a hollow shaft allows the respective other shaft to be received and/or a further shaft, such as a pitch tube, to be passed through. The rotor shaft assembly can thereby be configured so as to be compact in the axial direction. Likewise, a rotor in the generator unit can thus be placed close to the gearbox unit in the axial direction. The rotor shaft can also be configured as a separate component that can be connected to further rotor components in a simple manner.

In a further embodiment of the claimed rotor shaft assembly, the curved toothing on the output shaft is configured as an external toothing or as an internal toothing. Correspondingly thereto, the curved toothing on the rotor shaft is configured as an internal toothing or as an external toothing. A curved tooth coupling configured in this way offers a high mechanical load capacity for transmitting torque in a compact manner and allows simple assembly.

Moreover, the at least one supporting element and the support face can be produced at least partially from dissimilar materials. For example, the supporting element can be produced from a friction bearing material or be provided with a friction bearing material. This can be implemented, for example, by a friction-reducing coating. With a support face produced from a steel or a steel alloy for example, there is reduced friction between the support face and the supporting element, which in turn leads to reduced wear. Alternatively or additionally, the support face and/or the supporting element can be heat-treated, as a result of which the friction present there is further reduced. Moreover, the support face can also be at least partially produced from a friction bearing material or be provided with a friction bearing material.

In a further embodiment of the claimed rotor shaft assembly, the output shaft can be configured as a sun shaft of a planetary stage of the gearbox unit. The rotor shaft can be configured as a hollow shaft. The output shaft configures an external toothing for the curved tooth coupling, while the rotor shaft configures an internal toothing for the curved tooth coupling. The entire curved tooth coupling is thus configured radially inside the rotor shaft. The rotor shaft assembly thus allows the gearbox unit to be connected to the generator unit of a corresponding gearbox generator in a simple manner. The gearbox unit on the output side by way of the output shaft and the generator unit on the input side by way of the rotor shaft are preferably coupled directly to one another, i.e. without intervening, torque-transmitting components. The output shaft can be pushed partially into the interior of the rotor shaft, which is designed as a hollow shaft, so that the rotor shaft, viewed in the radial direction, can cover a part of the output shaft and in particular the entire curved toothing. In particular, the rotor shaft is able to be assembled on the output shaft so as to be connected directly to the rotor. Complex handling of the entire generator unit, which also comprises a housing, is thus avoided. The production of a gearbox generator with gearbox unit and generator unit is consequently accelerated and can therefore be carried out cost-effectively.

The object described at the outset is likewise achieved by a generator gearbox according to the invention, which comprises a gearbox unit and a generator unit releasably connected thereto. The gearbox unit and the generator unit are connected to one another in a torque-transmitting manner via a rotor shaft assembly, so that a disposed output shaft assigned to the gearbox unit drives a rotor shaft assigned to the generator unit. According to the invention, the rotor shaft unit is configured according to at least one of the embodiments described above. The technical advantages of the rotor shaft assembly or of the gearbox unit, respectively, are realized to a particular extent in a generator gearbox according to the invention.

The gearbox unit is suitable for being connected directly, i.e. without a separate coupling, to a generator unit so as to form a generator gearbox, so that these form an integrated unit. In particular, the gearbox unit comprises at least one planetary stage, i.e. a gearbox stage which is configured as a planetary gear. The at least one planetary stage has a shaft which is connected to a rotatable gearbox component, i.e. a sun gear, a planetary carrier or a ring gear of the planetary stage, and serves as the output shaft of the gearbox unit. Configured on the output shaft, on a portion facing the generator unit, is a curved toothing, which is suitable for forming a curved tooth coupling. At least one support face, which is suitable for adjustable axial positioning of the curved toothing in the curved tooth coupling, is configured in a region of the curved toothing. Adjustable axial positioning is to be understood to mean that an angular offset between the output shaft and a rotor shaft connected thereto in the assembled state can be compensated for by the curved tooth coupling. The adjustability can be an angular adjustability. Axial positioning is furthermore to be understood to mean holding the curved toothing in a position that ensures smooth angular adjustability between the output shaft and the rotor shaft. For this purpose, the gearbox unit can be configured to be combined with a rotor shaft assembly according to at least one of the embodiments outlined above. In the case of an output shaft which is configured as a sun shaft of a planetary stage, an advantageous angular adjustability is achieved for the output shaft by the claimed rotor shaft assembly. Accordingly, an automatically adjusting, advantageous alignment of the sun shaft can be achieved, in which a uniform load distribution is achieved between planet gears that mesh with the sun shaft. This minimizes wear in the gearbox unit.

The gearbox unit preferably has three or more planetary stages connected in series. A series connection here is a torque-transmitting connection between the planetary stages, through which a drive power supplied to the gearbox unit is carried out in an non-bifurcated manner. Such series connections are disclosed, inter alia, in the international application WO 2020/001942 A1. The disclosure content of WO 2020/001942 A1 is incorporated into the present application by reference. The claimed gearbox unit offers a high level of mechanical performance combined with a compact design, reduced weight and high cost-effectiveness.

Furthermore, the object illustrated is achieved by a wind turbine according to the invention. The wind turbine includes a multi-blade rotor rotatably disposed on a nacelle and connected to a main shaft. The main shaft is connected to a generator gearbox in a torque-transmitting manner and serves as an input shaft for the generator gearbox. According to the invention, the generator gearbox here is configured according to one of the embodiments outlined above.

Moreover, the underlying object is achieved by a computer program product according to the invention, which is configured to simulate an operating behavior of a rotor shaft assembly. For this purpose, the computer program product can comprise data on the kinematics of the output shaft, the rotor shaft and the curved tooth coupling. Furthermore, the computer program product can comprise simulation routines that are configured to determine a vibration behavior of the rotor shaft assembly based on information about dimensions of the rotor shaft, the output shaft and/or the curved tooth coupling. The computer program product can also have a data interface via which operating parameters, such as a rotating speed of the output shaft, a torque transported via the output shaft, or the alignment of the output shaft, can be specified. Likewise, the computer program product can also have a data interface for outputting simulation results. According to the invention, the rotor shaft assembly, the operating behavior of which can be simulated by means of the computer program product, is configured according to at least one of the embodiments outlined above. For this purpose, the computer program product can be embodied, for example, as a so-called digital twin. Such digital twins are presented, inter alia, in the published application US 2017/0286572 A1. The disclosure content of US 2017/0286572 A1 is incorporated into the present application by reference.

The underlying object is also achieved by a data agglomerate with data packets combined in a common file or distributed across different files for imaging the three-dimensional shape and/or the interactions of all components provided in the rotor shaft assembly according to the invention, the data packets being prepared for processing by a data processing device to carry out additive manufacturing of the components of the rotor shaft assembly, in particular by 3D printing, and/or to simulate the functional mode of the rotor shaft assembly. This enables cost-effective production of prototypes and/or computer-based simulations in order to study how the rotor shaft assembly works, to identify problems in the specific application and to find improvements.

The features of the individual claimed objects implement a coherent technical concept and can also be easily combined with one another separately. The invention will be explained in more detail hereunder with reference to individual embodiments in figures. The figures are to be read as complementing one another to the extent that the same reference symbols in different figures have the same technical meaning. The features of the individual embodiments can also be combined with one another. Furthermore, the embodiments shown in the figures can be combined with the features outlined above. In the individual figures:

DETAILED DESCRIPTION OF PREFERRED EMBODIMENTS

Figure 1:
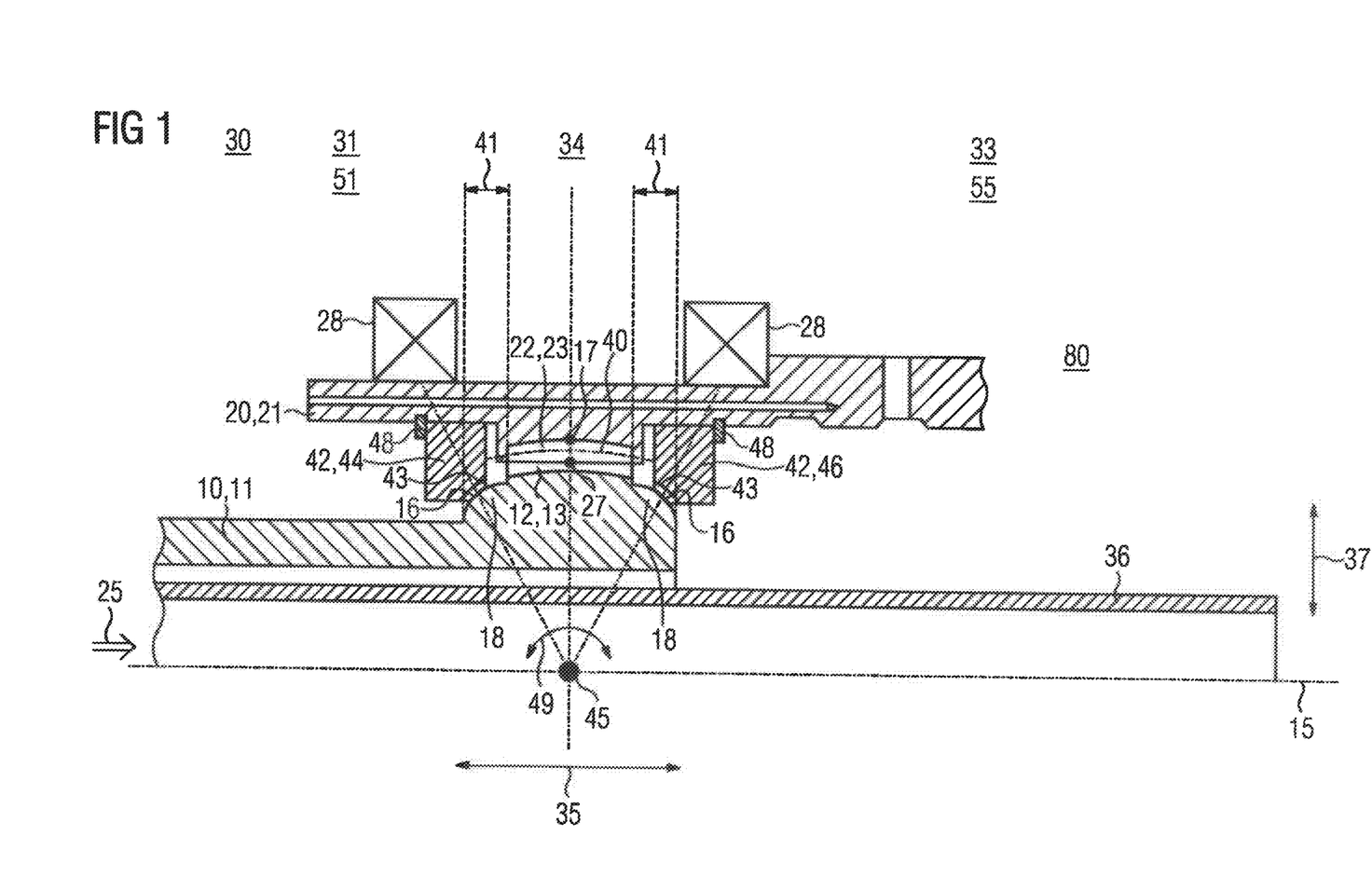
FIG. 1 schematically shows a first embodiment of the claimed rotor shaft assembly in longitudinal section.

FIG. 1 schematically illustrates a longitudinal section of a first embodiment of the claimed rotor shaft assembly 30, which comprises an output shaft 10, configured as a hollow shaft 11, and a rotor shaft 20, that is also configured as a hollow shaft 21 and is rotatably received in rotor shaft bearings 28 on a housing 34 not illustrated in more detail. A torque 25, which Is to be transmitted to the rotor shaft 20, is supplied via the output shaft 10 in relation to a main rotation axis 15. The output shaft 10 is assigned to a gearbox unit 51, not illustrated in more detail, on a gearbox side 31, and the rotor shaft 20 is assigned to a generator unit 53, not shown in more detail, on a generator side 33. The output shaft 10 at one end facing the generator side 33 is provided with a curved toothing 12 which is configured as an external toothing 13. The rotor shaft 20 is correspondingly provided with a curved toothing 22 which is configured as an internal toothing 23 and meshes with the curved toothing 12 of the output shaft 10. The curved toothings 12, 22 on the output shaft 10 and the rotor shaft 20 thus belong to a curved tooth coupling 40 which allows an angular offset between the output shaft 10 and the rotor shaft 20 about a pivot point 45. The angular offset can be established in each case for the output shaft 10 and the rotor shaft 20 in relation to the main rotation axis 15. As a result, an angular adjustability 49 is achieved, which is symbolized in FIG. 1 by the correspondingly designated double arrow. In an optimally aligned state, as shown in FIG. 1, an apex 17 of the curved toothing 12 on the output shaft 10 and an apex 27 of the curved toothing 22 on the rotor shaft 20 are positioned so as to be substantially in alignment in a radial direction 37.

The curved tooth coupling 40 also comprises supporting elements 42 which are configured so as to be encircling and are disposed in the region of the curved toothings 12, 22. In the assembled state, the supporting elements 42 are fastened with circlips 48. The supporting elements 42 are releasably mounted, with a first supporting element 44 being disposed on the gearbox side 31 in relation to the curved tooth coupling 40, and a second supporting element 46 on the generator side 33. By disposing the supporting elements 42, 44, 46 in a region 41 of the curved toothings 12, 22, the angular adjustability 49, i.e. the maximum achievable angular offset, is determined. The supporting elements 42, 44, 46 each have a mating face 43 which is configured so as to be encircling and substantially concave and is disposed opposite a support face 16 on the output shaft 10. The support faces 16 are configured integrally with the output shaft 10 and each are associated with a shoulder 18 which is also configured integrally with the output shaft 10. The support faces 16 are each configured so as to be substantially convex, with the shape of the support faces 16 corresponding to the concave shape of the mating faces 43 on the rotor shaft 20. The support faces 16 and the mating faces 43 are configured so as to be spherical and have the pivot point 45 of the angular adjustability 49 as the center. Such a spherical shape of the curved tooth coupling 40 offers a particular ease of movement for the angular adjustability 49. Furthermore, at least one of the supporting elements 42, 44, 46 in the region of the mating face 43 is produced from a different material than a corresponding support face 16 on the output shaft 10. At least one of the supporting elements 42, 44, 46 is produced from a friction bearing material that minimizes friction between the corresponding support face 16 and the supporting element 42, 44, 46. Furthermore, the curved tooth coupling 40, i.e. the curved toothings 12, 22 on the output shaft 10 and the rotor shaft 20, is positioned along an axial direction 35 by the supporting elements 42, 44, 46. The axial positioning by the supporting elements 42, 44, 46 guarantees that the curved toothings 12, 22 are minimized in terms of width, i.e. their dimensions along the axial direction 35. This guarantees that there is a maximum overlap of the curved toothings 12, 22 during engagement, i.e. when meshing. Accordingly, a minimum width is sufficient for the curved toothings 12, 22. Furthermore, a pitch tube 36 is rotatably accommodated in the output shaft 10 configured as a hollow shaft 11. A generator-proximal end face 14 of the output shaft 10 lies along the axial direction 35 in the region of the rotor shaft 20. The output shaft 10 is thus disposed without bearings on the generator side 33, which in turn reduces the number of components in the rotor shaft assembly 30 and simplifies its assembly. The rotor shaft assembly 30 in FIG. 1 is furthermore reproduced in a computer program product 80 which is configured to simulate the operating behavior of the rotor shaft assembly 30.

Figure 2:
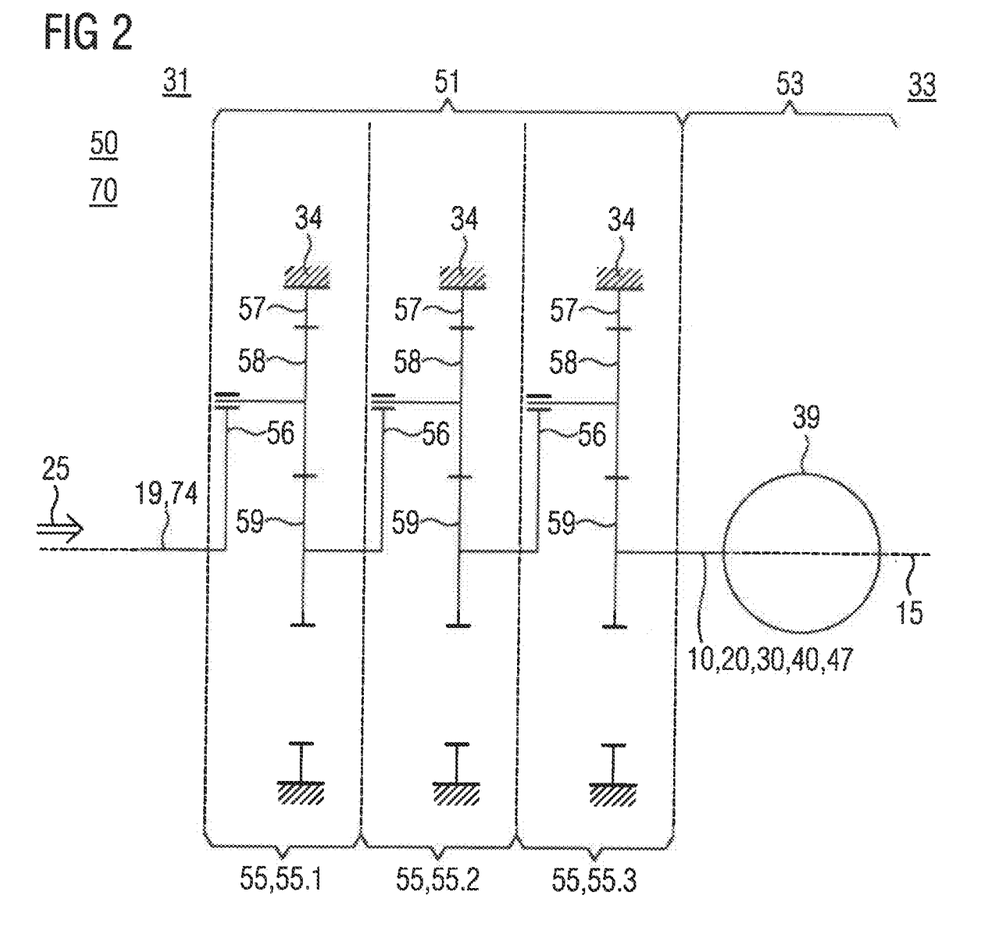
FIG. 2 shows a schematic construction of a first embodiment of the claimed generator gearbox.
Figure 3:
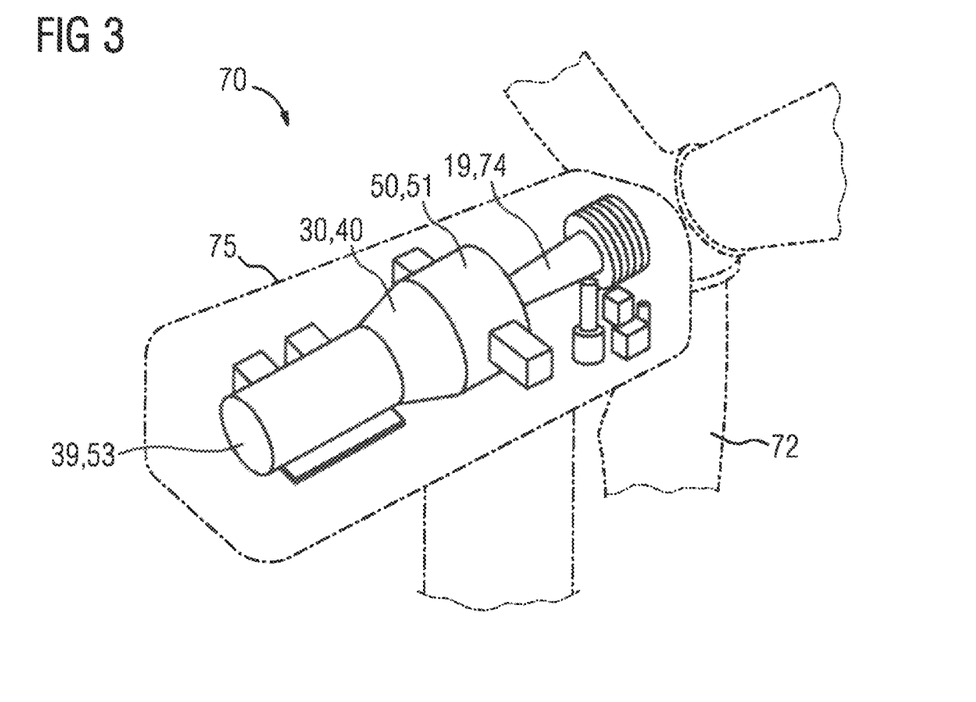
FIG. 3 shows a first embodiment of the claimed wind turbine in a sectional oblique view.

The construction of a first embodiment of the claimed generator gearbox 50 is schematically depicted in FIG. 2. The generator gearbox 50 comprises a gearbox unit 51 which is releasably connected to a generator unit 53. The gearbox unit 51 includes three planetary stages 55 which are connected in series, so that a torque 25 which is supplied via an input shaft 19 is transported between the planetary stages 55 to the generator unit 53 without bifurcation. The input shaft 19 is rotatable about a main rotation axis 15 of the generator gearbox 50 and is configured as a main shaft 74 of a wind turbine 70 not shown in more detail. The first, second and third planetary stages 55.1, 55.2, 55.3 each have a ring gear 57, a planetary carrier 56 with at least one planetary gear 58, and a sun gear 59. The ring gears 57 are fastened in a housing 34 which at least partially encloses the gearbox unit 51. The supplied torque 25 is accordingly transported from the gearbox side 31 in the direction of the generator side 33, with an output shaft 10 of the gearbox unit 51 being connected to a generator 39 on the generator unit 53 in a torque-transmitting manner. The output shaft 10 is configured as a sun shaft 47 of one of the planetary stages 55, in particular the third planetary stage 55.3. Furthermore, the output shaft 10 is associated with a rotor shaft assembly 30 which also includes a rotor shaft 20, the output shaft 10 and the rotor shaft 20 being connected to one another by means of a curved tooth coupling 40. The rotor shaft assembly 30 is configured according to one of the embodiments described above. A gearbox unit 51 with three planetary stages 55, 55.1, 55.2, 55.3, which is connected directly to a generator 39 via a sun shaft 47 serving as an output shaft 10, offers a particular level of performance, cost-effectiveness and reliability for a wind turbine 70, FIG. 3 shows the construction of a first embodiment of a claimed wind turbine 70 in a sectional oblique view. The wind turbine 70 comprises a multi-blade rotor 72 rotatably mounted on a nacelle 75 and connected in a torque-transmitting manner to a main shaft 74. The main shaft 75 serves as an input shaft 19 of a generator gearbox 50 which comprises a gearbox unit 51 and a generator unit 53 with a generator 39. The gearbox unit 51 and the generator unit 53 are connected to one another in a torque-transmitting manner via a rotor shaft assembly 30. The rotor shaft assembly 30 comprises a curved tooth coupling 40, through which an angular adjustability 49 between the gearbox unit 51 and the generator unit 53 is ensured. The rotor shaft assembly 30 here is configured according to at least one of the embodiments outlined above.

What is claimed is:

1. A wind turbine, comprising:
a nacelle;
a multi-blade rotor rotatably disposed on the nacelle;
a generator gearbox comprising a generator unit and a gearbox unit connected to the generator unit;
a main shaft connecting the rotor in a torque-transmitting manner to the generator gearbox;
an output shaft for the gearbox unit of the generator gearbox;
a rotor shaft for the generator unit of the generator gearbox; and
a curved tooth coupling designed to connect the output shaft and the rotor shaft to one another, said curved tooth coupling comprising at least one adjustable releasably fastened supporting element designed to adjust an axial position of the curved tooth coupling and including a mating face to support an axial force of the curved tooth coupling, with the mating face being designed to slide on a corresponding support face of the output shaft or of the rotor shaft when the output shaft is tilted relative to the rotor shaft.

2. The wind turbine of claim 1, wherein a first of the at least one adjustable releasably fastened supporting element is disposed on a side of the curved tooth coupling, which side faces the gearbox unit.

3. The wind turbine of claim 1, wherein a second of the at least one adjustable releasably fastened supporting element is disposed on a side of the curved tooth coupling, which side faces the generator unit.

4. The wind turbine of claim 1, wherein a first of the at least one adjustable releasably fastened supporting element and a second of the at least one adjustable releasably fastened supporting element in conjunction with the corresponding support faces form a ball joint bearing for the curved tooth coupling.

5. The wind turbine of claim 1, wherein the at least one adjustable releasably fastened supporting element is designed to provide a compensating axial clearance of the output shaft relative to the rotor shaft for compensating an axial thermal expansion during operation.

6. The wind turbine of claim 1, wherein the at least one adjustable releasably fastened supporting element is designed to captively couple the output shaft to the rotor shaft.

7. The wind turbine of claim 1, wherein the support face is designed as a shoulder in a region of a curved toothing.

8. The wind turbine of claim 7, wherein the shoulder is directly connected to the curved toothing and/or disposed directly adjacent to the curved toothing.

9. The wind turbine of claim 1, wherein the support face is configured to be at least partially convex in an encircling manner.

10. The wind turbine of claim 9, wherein the support face is designed as an annular spherical cap.

11. The wind turbine of claim 1, wherein the supporting element and the support face are at least partially produced from dissimilar materials.

12. The wind turbine of claim 1, wherein the mating face of the supporting element includes a portion which is at least partially configured to be concave in an encircling manner.

13. The wind turbine of claim 1, wherein the output shaft is configured as a sun shaft of a planetary stage of the gearbox unit and includes an external toothing for the curved tooth coupling, and wherein the rotor shaft is configured as a hollow shaft and includes an internal toothing for the curved tooth coupling, said curved tooth coupling being configured radially inside the rotor shaft.

* * * * *